United States Patent [19]

Wauson

[11] 3,890,782

[45] June 24, 1975

[54] VARIABLE SET POINT SPEED CONTROL FOR HYDROSTATIC TRANSMISSIONS

[75] Inventor: Warren C. Wauson, Duncan, Okla.

[73] Assignee: Halliburton Company, Duncan, Okla.

[22] Filed: Aug. 19, 1974

[21] Appl. No.: 498,810

[52] U.S. Cl. .................... 60/327; 60/445; 60/448; 60/449; 60/450
[51] Int. Cl. ........................................... F16h 39/46
[58] Field of Search ............ 60/327, 391, 445, 448, 60/449, 450, 487

[56] References Cited
UNITED STATES PATENTS

| | | | |
|---|---|---|---|
| 1,143,727 | 6/1915 | Robson | 60/449 |
| 2,946,194 | 7/1960 | Westbury | 60/448 X |
| 3,486,334 | 12/1969 | Miller | 60/450 |

Primary Examiner—Edgar W. Geoghegan
Attorney, Agent, or Firm—Floyd A. Gonzalez; John H. Tregoning

[57] ABSTRACT

A control for use in hydrostatic transmissions is presented that automatically holds constant the speed of a fixed displacement hydraulic motor being driven by a variable displacement hydraulic pump when the pump speed is not constant. A differential hydraulic pressure from a venturi in the transmission is placed across one cylinder to create a force which is balanced against the force from a regulated air set point signal pressure which is placed across another cylinder. A piston rod between the two cylinders is linked to the displacement control of the variable displacement pump such that a change in the pressure differential across either cylinder will change the displacement of the pump until the resultant forces from the pressure differentials across the cylinders are balanced.

16 Claims, 3 Drawing Figures 3,890,782

VARIABLE SET POINT SPEED CONTROL FOR HYDROSTATIC TRANSMISSIONS

BACKGROUND OF THE INVENTION

1. Field of the Invention

This invention relates to hydraulic power transmission systems where a driven variable displacement pump is the pressure fluid source which runs a fixed displacement motor. It more particularly deals with the condition responsive control of the displacement of the pump where one condition is the rate of flow of the fluid in the hydraulic transmission system.

2. Background of the Invention

In a hydraulic power transmission system where a variable displacement pump is used to translate fluid energy to a fixed displacement motor, variations in the pump speed will cause the speed of the motor to vary. These variations are a particularly serious problem where the pump is driven by a prime mover which is also the source of power for another system whose power and speed requirements vary, and where it is important to hold the speed of the hydraulic motor constant. In this case, the prime mover is being used to pump cement at high pressures while the hydraulic motor is used to mix the cement to exacting standards for use in oil wells. Changing load demands during the cement pumping process causes the speed of the prime mover to change. However, the speed of the hydraulic motor must be held constant so that the mixing process may be carefully controlled.

It is also desired to be able to select the speed, known as set point, at which the motor will be held. Prior art devices balance force from a pressure sensed in the hydraulic system of the transmission against a spring, using any imbalance to adjust the displacement of the pump until the forces are again balanced. Other devices use a cam to adjust the tension of the spring so that the motor may be held to more than one constant speed. All of these devices have only a limited number of set points, and require wide variations in pump speed before the displacement of the pump is changed.

The present invention provides a control system for hydraulic transmissions wherein the speed of a hydraulic motor is controlled by a regulated air signal providing an infinite number of set points. The invention is responsive to changes in the flow of hydraulic fluid in the hydraulic transmission to give an improved control which quickly corrects for changes in the pump speed to hold the speed of the hydraulic motor at a desired set point. A positive shut-off is also provided which stops the motor when its speed drops below a set minimum rpm.

A second embodiment of this invention provides a speed control for a hydrostatic transmission system which has a variable set point for maintaining the speed of a motor constant in either the forward or reverse direction. The second embodiment also includes a positive shut-off.

DESCRIPTION OF THE PREFERRED EMBODIMENT

Figure 1:
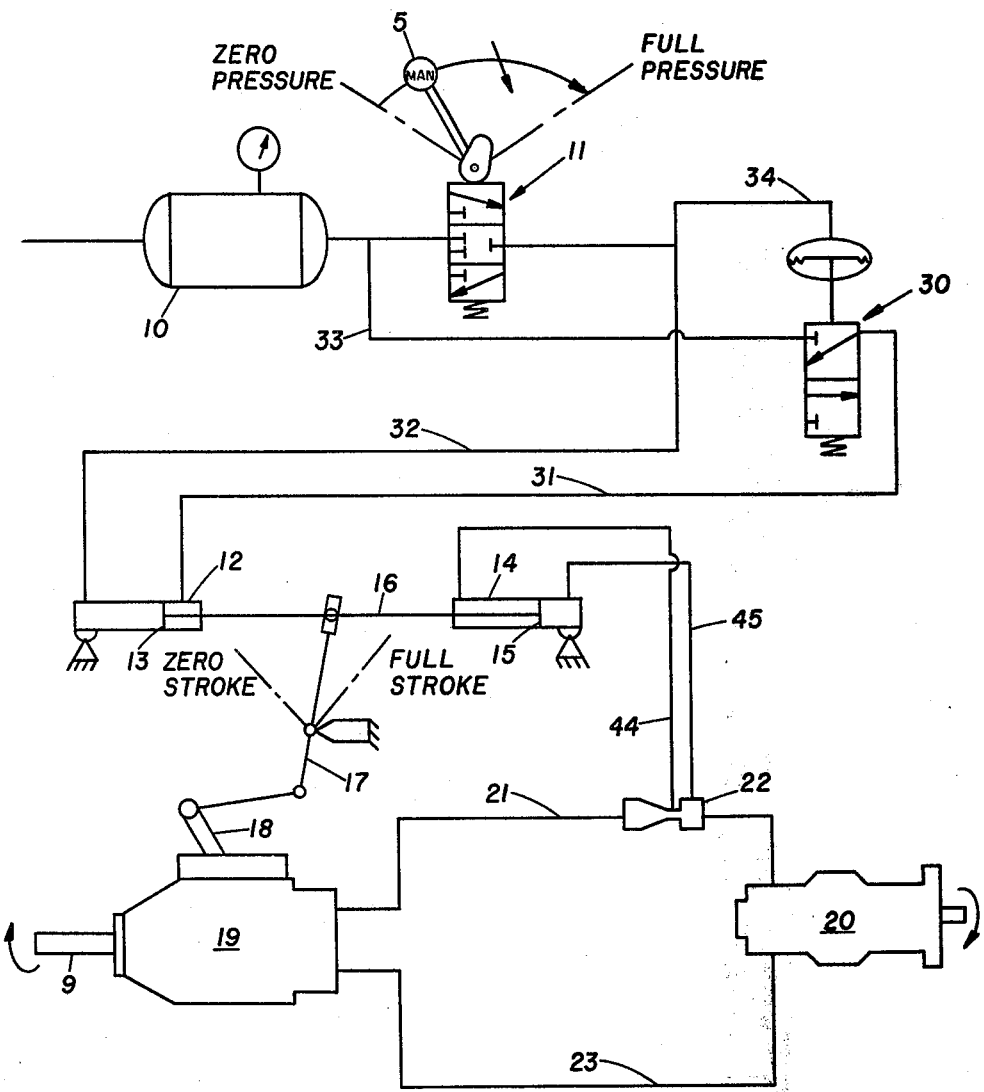
FIG. 1 is a schematic of a hydrostatic transmission system with a variable set point pneumatically balanced venturi speed control.

Turning now to the drawings, FIG. 1 shows a transmission in which the motor turns in one direction only. The hydrostatic transmission has a variable displacement pump 19 which drives a fixed displacement motor 20. The pump 19 is driven by some source of power through its input shaft 9. The pump 19 delivers high pressure oil through the high pressure conduit 23 to the motor 20. The high pressure oil drives the motor 20 and is exhausted into the low pressure conduit 21, and is returned to the pump 19. The displacement of the pump 19 is controlled by the variable displacement control lever 18. Such a hydrostatic transmission is the Sunstrand Hydro-Transmission sold by Sunstrand Corporation of LaSalle, Illinois.

In the Sunstrand Transmission, the variable displacement control lever 18 controls a servo system which in turn controls the position of the swashplate. The use of a servo system to change the variable displacement of the pump 19 allows a minimum force to move the control lever 18. The position of the control lever 18 will determine the angle of the swashplate and, therefore, the volume of oil displaced by the pump 19. The control 18 is stepless and therefore, the speed of the motor 20 driven by the pump 19 is infinitely variable from zero to a maximum.

The present invention has two double-acting cylinders 12 and 14 with opposing pistons 13 and 15 therein connected by rod 16. The rod 16 is connected to the variable displacement control 18 by linkage 17. Movement of the rod 16 to the right moves the control lever 18 toward the full stroke position, while movement of the rod 16 to the left moves the control lever 18 toward the zero stroke position.

A venturi 22 is located in the low pressure conduit 21 with an oil conduit 45 connecting the mouth of the venturi to the right hand side of the double-acting cylinder 14. An oil conduit 44 connects the throat of the venturi 22 to the left hand side of the double-acting cylinder 14. The venturi 22 is placed in the low pressure conduit 21 rather than the high pressure conduit 23 to reduce control system hysteresis due to the higher piston rod packing friction values associated with higher pressures.

The delivery from a compressed air source such as a compressed air reservoir 10 pressurized by an appropriate air compressor is regulated by an air regulator 11. The preferred regulator is one which has a manual lever control 5 which is stepless and which regulates the air pressure from zero to a maximum. The schematic representation of regulator 11 is shown in a quiescent position with the air pressure in output line 34 at the desired pressure as controlled by the setting of the manual control lever 5. If control lever 5 is moved to the left to a decreased pressure setting, the regulator 11 will move to a position represented by the lower third of the regulator symbol. Air will be exhausted from conduit 34 until the pressure decreases by the desired amount. The regulator 11 will then return to its quiescent position. If the control lever 5 is moved to the right to an increased pressure setting, the regulator 11 will move to a position represented by the upper third of the regulator symbol; and pressurized air from reservoir 10 will flow into conduit 34 until pressure in conduit 34 is raised to the desired level. After the desired pressure is reached, regulator 11 will again move to the quiescent position.

Any manual or automatic regulator which regulates air pressure from zero to a maximum could be used in place of the one described depending on the particular application or type of control desired.

Conduit 34 is connected to one side of the diaphragm of a diaphragm controlled valve 30. When the air pressure in conduit 34 increases above a given pressure, (typically 5 psi) the value moves to the position shown. When the air pressure in conduit 34 is below that given pressure, the valve is moved to its alternate position by its spring.

When the diaphragm operated valve 30 is in the position shown in FIG. 1, the right side of cylinder 12 is exhausted through conduit 31 and valve 30. When the diaphragm operated valve 30 is in its alternate position, high pressure air from the reservoir 10 is communicated through conduit 33, valve 30, conduit 31, and into the right side of cylinder 12.

In operation, a prime mover is connected to input shaft 9 to drive the pump 19. However, no hydraulic fluid will be pumped and the motor 20 will not be driven as long as the displacement control lever 18 remains in the neutral or zero stroke position.

When regulated compressed air is introduced through conduit 32 and into the left side of the double-acting cylinder 12, the piston 13 is moved to the right and pushes rod 16 to the right with it. Likewise, control lever 18 is moved from the neutral position and the pump 19 begins to displace fluid through the conduits 23 and 21 and motor 20 begins to turn.

Hydraulic fluid flow through the venturi 22 in the low pressure conduit 21 will cause a pressure differential between conduits 44 and 45, with the pressure in conduit 45 being greater than the pressure in 44. This pressure differential causes the piston 15 in double-acting cylinder 14 to move to the left in opposition to the movement caused by piston 13. When the force on rod 16 caused by the pressure differential across cylinder 12 is balanced with the force on rod 16 caused by the pressure differential across cylinder 14, movement in the rod 16 stops and the control lever 18 is held stationary by linkage 17.

It can be seen that if the speed of the prime mover driving pump 19 changes so that the prime mover slows down, the flow of hydraulic fluid through the venturi 22 will decrease, and the pressure differential across cylinder 14 will likewise decrease. The higher force on the rod 16 from the cylinder 12 will cause the rod 16 to move to the right, and will move the variable displacement control lever 18 through linkage 17. This movement will cause pump 19 to displace more fluid thus increasing the velocity of the fluid through venturi 22 until the force on rod 16 from the pressure differential across cylinder 14 is again equal to the force from cylinder 12.

If the prime mover speeds up, the pump 19 will increase the flow of hydraulic fluid through the venturi 22. In this case the force on the rod 16 from cylinder 14 will be higher than the force on the rod 16 from cylinder 12. Rod 16 will move to the left, adjusting the variable displacement control 18 until the forces on rod 16 are again balanced and movement in rod 16 ceases.

Thus, it is seen that the flow of the hydraulic fluid in the transmission and therefore the speed of the motor 20 is automatically maintained even though the speed of the prime mover driving the pump 19 may vary. To change the speed of the motor, it is only necessary to increase or decrease the air pressure on the left side of cylinder 12 by adjusting the control lever 5 of the air regulator 11.

When regulator 11 reduces the air pressure in conduit 34 below the level required to keep the diaphragm operated valve 30 in its first position, the valve 30 will move to its second position communicating high pressure air from conduit 33 into conduit 31 and into the right side of cylinder 12. This higher pressure in the right side of cylinder 12 will move piston 13 to the left and the control lever 18 to the zero stroke position. Thus, a positive shut-off control is provided which moves and holds the pump 19 at the zero stroke position after the speed of the motor 20 is slowed below a set value.

Figure 2:
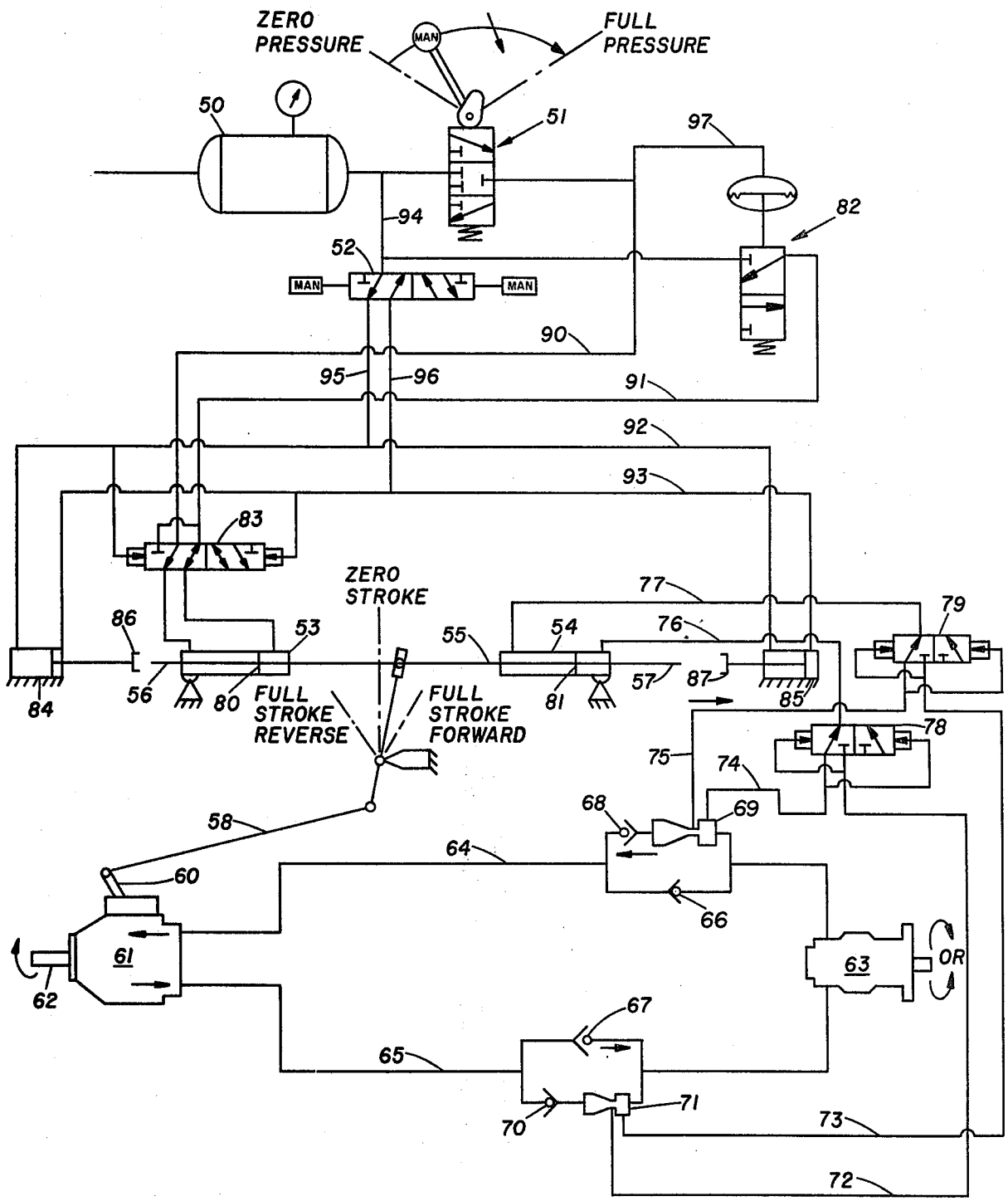
FIG. 2 is a schematic of a hydrostatic transmission system with a variable set point pneumatically balanced venturi speed control for motor control in both the forward and reverse directions.

The hydrostatic transmission and control system of FIG. 2 shows the present invention as used in a transmission in which the motor turns in both a forward and a reverse direction. Pump 61 is a reversible variable displacement pump. A suitable pump would be a variable displacement, reversing swashplate pump in which the swashplate is controlled and positioned by a servo system. Such a pump is sold by Sunstrand Corporation of LaSalle, Illinois and is described in Bulletin 9565 published by the Sunstrand Corporation.

The position of the control lever 60 will determine the angle of the swashplate and, therefore, the volume of oil displaced by the pump. When the variable pump swashplate is tilted and the pump 61 is driven by a prime mover through input shaft 62 at a given speed, a certain flow from the pump is produced. This flow is transferred through fluid conducting lines 64 and 65 to the motor 63. The ratio of the volume of the flow from the pump 61 to the displacement of the motor 63 will determine the speed of the motor output shaft.

Moving the control lever 60 to the opposite side of neutral, the flow from the pump 61 is reversed and the motor output shaft turns in the opposite direction. It can be seen that when the flow reverses, the line which was previously communicating fluid from the pump 61 to the motor 63 will communicate fluid from the motor 63 to the pump 61, and vice versa. Thus, each line will be the high pressure, motor feeding line when the pump 61 is pumping in one direction; and will be the low pressure, motor exhausting line when the pump 61 is pumping in the other direction.

For purposes of illustration, fluid conducting line 65 will be considered the high pressure line when pump 61 is pumping in the forward direction; and fluid conducting line 64 will be considered the high pressure line when pump 61 is pumping in the reverse direction. Thus when the control lever 60 is in its forward range, fluid flow will be from pump 61 through line 65 at high pressure to motor 63 and back to pump 61 through line 64 at low pressure. When the control lever 60 is in its reverse range, fluid flow will be from pump 61 through line 64 at high pressure and back to pump 61 through line 65 at low pressure. The arrows in FIG. 2 show the direction of fluid flow when the pump displaces fluid in the forward direction.

Two opposing pistons 80 and 81 are located in cylinders 53 and 54 respectively and are joined by a connecting rod 55. It should be noted that pistons 80 and 81 have rods 56 and 57 extending from their sides opposite rod 55 in order that the pressure responsive area on each side of the pistons 80 and 81 will be equal.

The connecting rod 55 is connected to the control lever 60 by linkage 58 so that any movement in the opposing pistons 80 and 81 will be transmitted through rod 55 and linkage 58 to control lever 60.

Air pressure from a compressed air source 50 is regulated by an appropriate air regulator 51; and the regulated air pressure signal is delivered through conduit 90, through double piloted four-way valve 83, and into cylinder 53. A manually operated four-way valve 52 acts as the transmission direction control. Valve 52 communicates high pressure air in conduit 94 with conduits 95 and 92 when the valve 52 is in its first position as shown, and communicates high pressure air in conduit 94 with conduits 96 and 93 when the valve is in its second position.

When the valve 52 is in its first position as shown, conduit 93 is exhausted; and when valve 52 is in its second position, conduit 92 is exhausted. Also, when four-way valve 52 is in its first position, the high pressure air in conduit 92 holds the double piloted four-way valve 83 in its first position as shown in FIG. 2. When valve 52 is shifted to its second position and high pressure air is changed from conduit 92 to conduit 93, the higher pressure in conduit 93 will shift four-way valve 83 to its second position as shown in FIG. 3.

When four-way valves 52 and 83 are in their first position, the regulated air signal from regulator 51 is introduced through conduit 90, through the left side of valve 83 as shown in FIG. 2, and into the left side of cylinder 53. At the same time, the right side of cylinder 53 is communicated through valve 83 with conduit 91.

Figure 3:
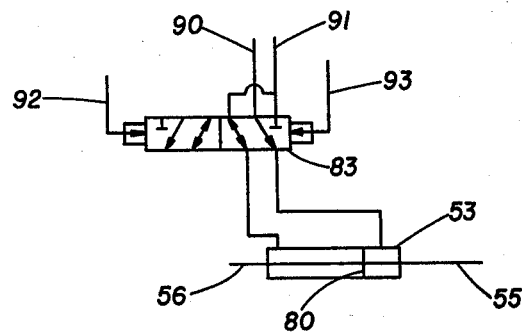
FIG. 3 shows valve 83 in its alternate position.

When four-way valves 52 and 83 are in their second position, the regulated air signal from regulator 51 is introduced through conduit 90, through the right side of valve 83 as shown in FIG. 3, and into the right side of cylinder 53. Also, with valves 52 and 83 in their second position, the left side of cylinder 53 is communicated through valve 83 with conduit 91 as shown in FIG. 3.

Regulator 51 is preferably the same regulator as regulator 11 which is described in connection with the embodiment shown in FIG. 1. As with regulator 11, regulator 51 may be any manual or automatic regulator which varies air pressure from zero to a maximum pressure.

The regulated air signal is conducted by conduit 97 to one side of the diaphragm of a diaphragm operated valve 82. As in the first embodiment, when the regulated air pressure in conduit 97 exceeds a desired value, the diaphragm moves the valve 82 to the first position as shown in FIG. 2. When the air pressure in conduit 97 is lowered below this set operating pressure, the valve 82 is shifted to its second position.

When valve 82 is in its first position, conduit 91 is exhausted; and when valve 82 is in its second position, the high pressure air in conduit 94 is communicated with conduit 91 through valve 82.

It can be seen that when there is sufficient air pressure in conduit 97 to operate diaphragm operated valve 82, and when valves 52 and 83 are in their first position, piston 80 will be moved to the right. If the air pressure in conduit 97 is lowered below the operating pressure of valve 82 and valves 52 and 83 remain in their first position, valve 82 will shift to its second position and high pressure air will be conducted through valve 82, conduit 91, valve 83, the right side of cylinder 53, and move piston 80 to the left.

Rod 56 has the same cross-sectional area as rod 55 in order that the magnitude of the force is the same regardless of whether the regulated air pressure signal is applied to the right or the left side of piston 80.

Venturi 69 is placed in line 64 in series with check valve 68. Check valve 68 passes fluid when the pump 61 is in its forward stroke, and blocks fluid flow when pump 61 is in its reverse stroke. Bypass valve 66 is in parallel with check valve 68 and venturi 69 to shunt fluid around venturi 69 when pump 61 is in its reverse stroke.

Venturi 71 is placed in line 65 in series with check valve 70. In this case check valve 70 passes fluid when pump 61 is in its reverse stroke, and blocks fluid when pump 61 is in its forward stroke. Bypass valve 67 is in parallel with check valve 70 and venturi 71 to shunt fluid around venturi 71 when pump 61 is in its forward stroke.

Double piloted three-way valve 78 communicates the mouth of venturi 69 through conduits 74 and 76 with the right side of cylinder 54 when it is in its first position as shown in FIG. 2. When valve 78 shifts to its second position, valve 78 communicates the throat of venturi 71 through conduits 72 and 76 with the right side of cylinder 54.

Double piloted three-way valve 79 communicates the throat of venturi 69 through conduits 75 and 77 with the left side of cylinder 54 when it is in its first position as shown in FIG. 2. When valve 79 shifts to its second position, valve 79 communicates the mouth of venturi 71 through conduits 73 and 77 with the left side of cylinder 54.

It can be seen that check valves 68 and 70, bypass valves 66 and 67, and double piloted three-way valves 78 and 79 are arranged to place across cylinder 54 the pressure differential of the venturi which is in the fluid conducting line returning fluid from the motor 63 to the pump 61 regardless of the direction of the flow from the pump. As in the first embodiment, this arrangement takes the flow responsive fluid signal from the low pressure conduit rather than the high pressure conduit regardless of the direction of the fluid flow from pump 61.

When pump 61 operates in the forward direction as shown in FIG. 2: check valve 70 is closed and bypass valve 67 is open so that the fluid flow bypasses venturi 71; check valve 68 is open and bypass valve 66 is closed so that fluid does flow through venturi 69; and valves 68 and 69 are piloted by the higher pressures in conduits 72 and 73 to their first position. As is well known, a lower pressure will result in the throat of the venturi. The higher pressure at the mouth of venturi 69 is communicated through conduit 74, three-way valve 78, and conduit 76 into the right side of cylinder 54. The lower pressure at the throat of venturi 69 is communicated through conduit 75, three-way valve 79 and conduit 77 into the left side of cylinder 54.

When pump 61 operates in the reverse direction: check valve 68 is closed and bypass valve 66 is open so that fluid flow bypasses venturi 69; check valve 70 is open and bypass valve 67 is closed so that fluid does flow through venturi 71; and valves 78 and 79 are piloted by the higher pressures in conduits 74 and 75 to their second position. The higher pressure at the mouth of venturi 71 is communicated through conduit 73, three-way valve 79, and conduit 77 into the left side of cylinder 54. The lower pressure at the throat of venturi 71 is communicated through conduit 72, three-way valve 78, and conduit 76 into the right side of cylinder 54.

Thus, when pump 61 pumps in the forward direction, piston 81 is pushed to the left by the higher pressure in conduit 76; and when pump 61 pumps in the reverse direction, piston 81 is pushed to the right by the higher pressure in conduit 77. The cross-sectional area of rod 57 is equal to the cross-sectional area of rod 55 so that the magnitude of the resultant force will be equal for equal pressure differentials, regardless of the direction of the displacement of pump 61.

To operate the hydrostatic transmission in the forward direction, the four-way valve 52 is set in the position shown in FIG. 2. The setting of valve 52 in its first position in turn shifts valve 83 to its first position. The compressed air signal in the left side of cylinder 53 moves piston 80 to the right which in turn moves the control lever 60 in the forward range through the action of rod 55 and linkage 58.

The pump being driven by a prime mover through input shaft 62, pumps fluid through the transmission in the forward direction as set out above and as shown by the arrows in FIG. 2 to drive the motor 63. The pressure differential created by venturi 69 moves piston 81 to the left until the force on rod 55 from piston 81 is equal to the force on rod 55 from piston 80.

If the speed of the prime mover increases, the flow of the hydraulic fluid will increase, and a higher pressure differential across venturi 69 will be transmitted to cylinder 54 to move piston 81 to the left. This movement will be transmitted to control lever 60 by the movement of rod 55 and linkage 58. Movement of the control lever 60 will decrease the displacement of the pump 61 until the force on rod 55 from piston 81 again equals the force on rod 55 from piston 80, and movement of the rod 55 ceases.

If the speed of the prime mover decreases, the force from piston 81 on rod 55 will be less than the force from piston 80, and the rod 55 will move to the right. This movement will change the control lever 60 to increase the displacement of pump 61 until the force from piston 81 is again equal to the force from piston 80. In order to change the set-point of the control, and thus the speed of the motor 63, it is only necessary to increase or decrease air pressure to cylinder 53 by adjusting the setting of regulator 51.

To run the transmission in reverse, the four-way valve 52 is set in its second position. The resultant reversal of pressure in conduits 92 and 93 shifts valve 83 to its second position and the pressurized air signal is introduced in the right side of cylinder 53. If at the time valve 52 is changed the transmission is running in the forward direction, the pressure differential from venturi 69 will assist the air pressure in cylinder 53 to move the control lever 60 to the zero stroke position. Once there, the air signal will shift the control lever 60 into the reverse range.

When the displacement from the pump 61 reverses, the fluid will flow through the transmission in the reverse direction and three-way valves 78 and 79 will shift to their second position as explained above. The pressure differential created from venturi 71 is now transmitted to cylinder 54 with the resultant force from piston 81 to the right in opposition to the force from piston 80. The use of rods 56 and 57 in the cylinders makes the forces equal in either direction for the same pressure differentials so that the responsiveness and settings of the control is the same in either the forward or reverse direction.

As discussed above, any differences between the forces from pistons 80 and 81 will cause the rod 55 to move, thereby changing the position of control lever 60 and the displacement of the pump 61 until the forces are again equal.

Cylinders 84 and 85 provide an automatic stop for holding the control of FIG. 2 at the zero stroke position when it is desired to stop motor 63. When four-way valve 52 is in its first position, the high pressure air in conduit 92 is introduced into the left side of cylinders 84 and 85. The right side of cylinders 84 and 85 are exhausted through conduits 93 and 96, and valve 52. In response to the pressure differentials across cylinders 53 and 54, stop 86 is fully extended and stop 87 is fully retracted as shown in FIG. 2. Cylinder 84 is so spaced from cylinder 53 that when stop 86 is fully extended and rod extension 56 is abutted against stop 86, control lever 60 will be in the zero stroke position.

To stop motor 63 when the transmission is running in the forward direction, it is only necessary to reduce the air pressure signal in conduit 97 by moving the manual control lever of regulator 51 toward the zero pressure setting. When the pressure in conduit 97 decreases below the level needed to hold the diaphragm operated valve 82 in its first position, the valve 82 moves to its alternate position. High pressure air in conduit 94 now flows through valve 82, through conduit 91, through valve 83 and into the right side of cylinder 53. Piston 80 is driven to the left by the high pressure air until rod extension 56 comes to rest against stop 86. Thus it can be seen that a positive shut-off control is provided which stops motor 63 after its speed has dropped below a selected rpm.

If the hydraulic transmission is being operated in the reverse direction, high pressure air will be introduced into the right sides of cylinders 84 and 85 through conduits 96 and 93. The pistons in cylinders 84 and 85 will be driven to the left fully extending stop 87 and retracting stop 86. Sufficient decrease in the regulated air signal in conduit 97 will cause high pressure air to be fed into the left side of cylinder 53 by the action of valve 82 as described. Piston 80 will then be driven to the right until rod extension 57 comes to rest against stop 87, thus holding control lever 60 in the zero stroke position.

A mechanical stop could be used to stop the movement of rod 55 at the zero stroke position. If such a mechanical stop were used, four-way valve 52 and cylinders 84 and 85 would be eliminated, and valve 83 would be manually operated.

Another method of stopping the transmission would be to remove the air signal from cylinder 53 altogether. Thus, any flow in the transmission would move the rod 55 to the zero stroke position. This would be true whether the flow was in the forward or the reverse direction.

While particular embodiments of the present invention have been shown and described, it is apparent that changes and modifications may be made without departing from this invention in its broader aspects; and, therefore, the aim in the appended claims is to cover all such changes and modifications as fall within the true spirit and scope of this invention.

What is claimed is:

1. A control system for hydraulic transmissions having a variable displacement pump driving a hydraulic motor in a hydraulic system comprising:
   a regulated air pressure signal;
   sensing means in said hydraulic system for creating a fluid pressure signal responsive to the flow of hydraulic fluid in said hydraulic system;
   two opposing pistons, one being responsive to said regulated air signal and the other being responsive to the fluid pressure signal of said sensing means; and
   means responsive to said opposing pistons for controlling the displacement of said variable displacement pump.

2. The apparatus of claim 1 wherein said sensing means is a venturi in that part of said hydraulic system which exhausts said hydraulic motor.

3. The apparatus of claim 1 further comprising:
   a high pressure air signal; and
   means for controlling said air responsive piston which when in a first position exhausts one side of said piston such that said air responsive piston opposes said fluid pressure responsive piston, and which when in a second position directs said high pressure air signal to one side of said air responsive piston for movement in opposition to the movement caused by said regulated air pressure signal on the other side of said air responsive piston.

4. The apparatus of claim 3 wherein said air responsive piston controlling means is a diaphragm operated valve operated by said regulated air signal which shifts from said second position to said first position when said regulated air signal exceeds a predetermined pressure, and which returns to said second position when said regulated air signal is reduced to said predetermined pressure.

5. In a hydraulic transmission system which includes a variable displacement pump having an adjustable control lever which controls the displacement of the pump, a hydraulic motor, a high pressure conduit conducting hydraulic fluid from the pump to the motor, and a low pressure conduit conducting hydraulic fluid from the motor to the pump, the combination comprising:
   a regulated pressurized air signal;
   two opposing pistons connected to each other wherein movement in one causes a corresponding movement in the other;
   controlling means for biasing the first of said opposing pistons in a first direction in response to said regulated pressurized air signal;
   sensing means for creating a pressure differential across the second piston of said opposing pistons in response to the flow of hydraulic fluid in said hydraulic transmission system thereby biasing said opposing pistons in a second direction opposite to said first direction; and
   means connected to said adjustable control lever responsive to movement in said opposing pistons for changing said control lever thereby changing the displacement of said variable displacement pump until movement of said opposing pistons ceases.

6. The apparatus of claim 5 wherein said controlling means includes a two-position means for biasing said first piston in the first direction when in a first position, and for biasing said first piston in the second opposite direction when in a second position.

7. The apparatus of claim 5 wherein said sensing means comprises a venturi in said hydraulic system, a fluid conduit communicating fluid pressure from the mouth of said venturi to one side of said second piston, and a fluid conduit communicating fluid pressure from the throat of said venturi to the second side of said second piston.

8. The apparatus of claim 5 wherein said sensing means is placed in said low pressure conduit.

9. In a hydraulic transmission system having: a reversible variable displacement pump having an adjustable control lever with a zero stroke position, a forward stroke range wherein the displacement of said pump is varied in the forward direction, and a reverse stroke range wherein the displacement of said pump is varied in the reverse direction; a hydraulic motor; and a hydraulic conduit system wherein hydraulic fluid is carried from said pump to said motor and returned from said motor to said pump; the combination comprising:
   a regulated air pressure signal;
   two opposing pistons connected to each other wherein movement in one causes a corresponding movement in the other;
   a two-position controlling means for biasing the first of said opposing pistons in a first direction in response to said regulated air pressure signal when said controlling means is in a first position, and for biasing said first piston in a second direction opposite to said first direction in response to said air signal when said controlling means is in a second position;
   a forward sensing means for creating a pressure differential in response to the flow of hydraulic fluid in said hydraulic conduit system when said controlling means is in the first position;
   a reverse sensing means for creating a pressure differential in response to the flow of hydraulic fluid in said hydraulic conduit system when said controlling means is in the second position;
   switching means for placing the pressure differential of said forward sensing means across said second piston so that said second piston is biased in said second direction when said controlling means is in the first position, and for placing the pressure differential of said reverse sensing means across said second piston so that said second piston is biased in said first direction when said controlling means is in the second position; and
   means connected to said adjustable control lever responsive to movement in said opposing pistons for changing said control lever thereby changing the displacement of said reversible variable displacement pump in either the forward or reverse stroke ranges until movement of said opposing pistons ceases.

10. The apparatus of claim 9 wherein said forward sensing means is located in that part of said hydraulic conduit system which returns hydraulic fluid from said motor to said pump when said movable control is in the forward stroke range, and said reverse sensing means is located in that part of said hydraulic conduit system which returns hydraulic fluid from said motor to said pump when said movable control is in the reverse stroke range.

11. The apparatus of claim 10 wherein said forward sensing means comprises a first check valve passing hydraulic fluid when said pump is in the forward stroke range and blocking hydraulic fluid when said pump is in the reverse stroke range, a first venturi in series with said first check valve, and a first bypass valve bypassing hydraulic fluid around said first check valve and said first venturi when said pump is in the reverse stroke range and directing hydraulic fluid through said first check valve and said first venturi when said pump is in the forward stroke range; and said reverse sensing means comprises a second check valve passing hydraulic fluid when said pump is in the reverse stroke range and blocking hydraulic fluid when said pump is in the forward stroke range, a second venturi in series with said second check valve, and a second bypass valve bypassing hydraulic fluid around said second check valve and said second venturi when said pump is in the forward stroke range and directing hydraulic fluid through said second check valve and said second venturi when said pump is in the reverse stroke range.

12. The apparatus of claim 11 wherein said switching means comprises:

a first valve means for communicating hydraulic fluid from the mouth of said first venturi to the first side of said second piston when said pump is in the forward stroke range, and for communicating hydraulic fluid from the throat of said second venturi to the first side of said second piston when said pump is in the reverse stroke range; and a second valve means for communicating hydraulic fluid from the throat of said first venturi to the second side of said second piston when said pump is in the forward stroke range, and for communicating hydraulic fluid from the mouth of said second piston when said pump is in the reverse stroke range.

13. The apparatus of claim 9 further comprising:

stop means responsive to said two-position controlling means for preventing said opposing pistons from moving said adjustable control lever into the reverse stroke range when said controlling means is in its first position, and for preventing said opposing pistons from moving said adjustable control lever into the forward stroke range when said controlling means is in its second position.

14. The apparatus of claim 13 further comprising:

shut-off means responsive to said regulated air signal for moving said first piston in the direction opposite to the direction said first piston is being biased by said regulated signal when said regulated air signal is below a predetermined minimum pressure until said opposing pistons are prevented from moving further by said stop means.

15. The method of controlling the speed of a hydraulic motor being driven by hydraulic fluid pumped by a variable displacement pump comprising the steps of:

creating a first force responsive to a regulated air signal;

creating a second force responsive to the flow of said hydraulic fluid;

opposing said first force with said second force; and changing the displacement of said variable displacement pump responsive to said opposing forces until said opposing forces are balanced.

16. In a hydraulic transmission system having a hydraulic motor being driven by hydraulic fluid pumped by a reversible variable displacement pump, the method of changing the speed of said hydraulic motor from a speed in the forward direction to a set speed in the reverse direction comprising the steps of:

creating a first force responsive to a regulated air signal;

creating a second force responsive to the flow of said hydraulic fluid in the forward direction;

decreasing the displacement in the forward direction of said reversible variable displacement pump responsive to said first force and said second force until zero displacement of said variable displacement pump is reached;

reversing the displacement of said variable displacement pump responsive to said first force;

creating a third force responsive to the flow of said hydraulic fluid in the reverse direction;

opposing said first force with said third force; and increasing the displacement in the reverse direction of said reversible variable displacement pump responsive to said opposing first and third forces until said opposing forces are balanced.

* * * * *